June 5, 1923.  
G. H. E. DE RAM  
1,457,884
SUSPENSION OF AUTOMOBILES AND OTHER VEHICLES
Filed Aug. 16, 1921  4 Sheets-Sheet 1
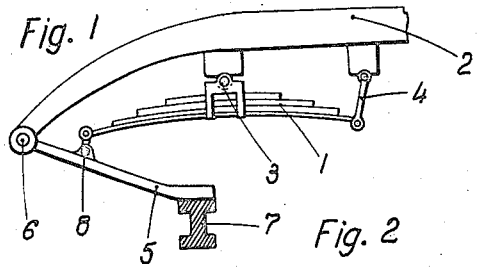
Fig. 1
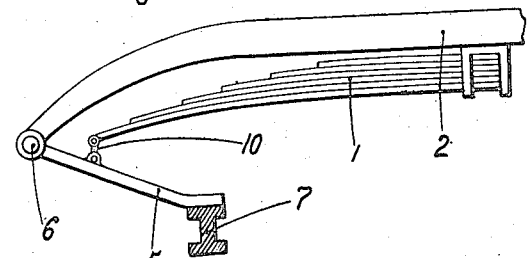
Fig. 2
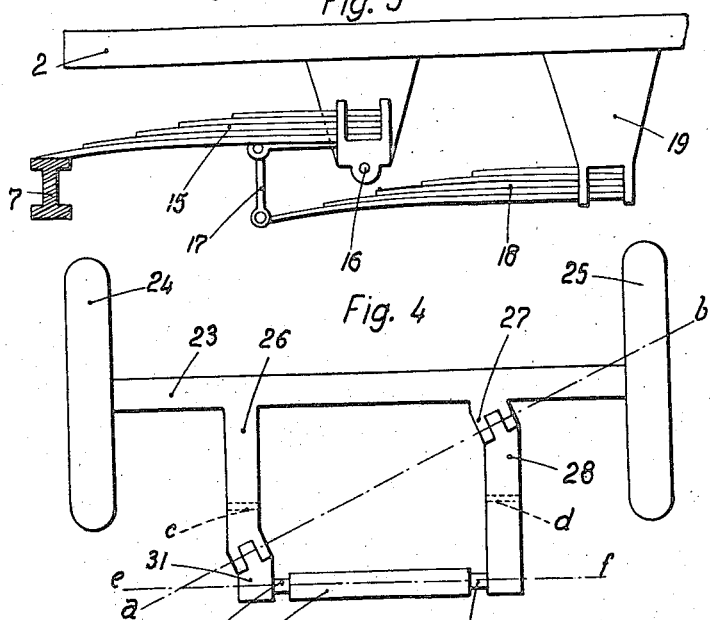
Fig. 3
Fig. 4
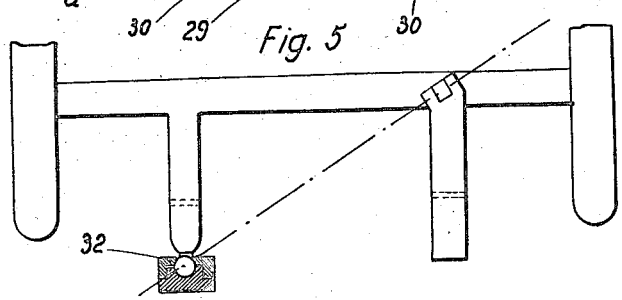
Fig. 5
Inventor.
Georges H. E. de Ram
by Chas. J. O'Neill
Atty June 5, 1923.

G. H. E. DE RAM

SUSPENSION OF AUTOMOBILES AND OTHER VEHICLES

Filed Aug. 16, 1921   4 Sheets-Sheet 2

1,457,884

Inventor.
George H. E. de Ram.
by Chas. J. O'Neill
atty

June 5, 1923.
G. H. E. DE RAM
SUSPENSION OF AUTOMOBILES AND OTHER VEHICLES
Filed Aug. 16, 1921   4 Sheets-Sheet 3
1,457,884
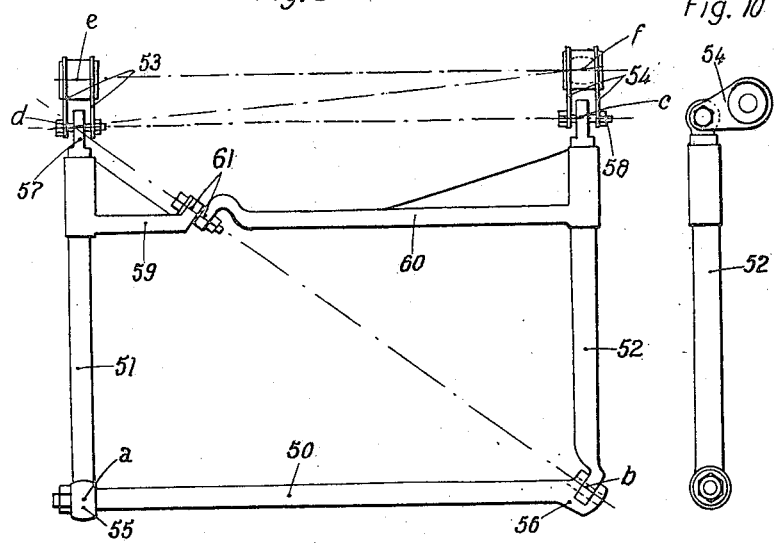
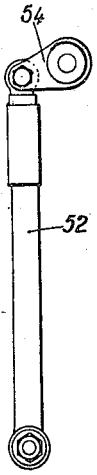
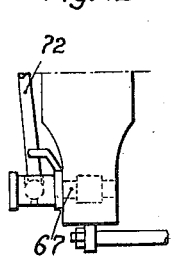
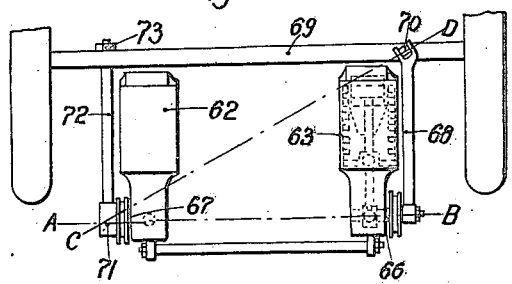
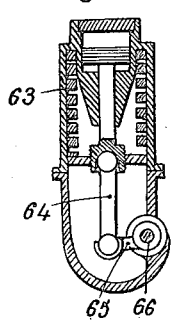
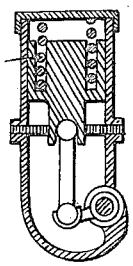
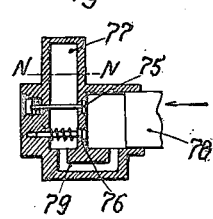
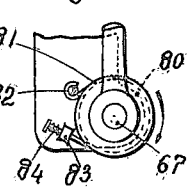
Inventor.
Georges H. E. de Ram
by Chas. J. O'Neill
Atty June 5, 1923.     1,457,884

G. H. E. DE RAM

SUSPENSION OF AUTOMOBILES AND OTHER VEHICLES

Filed Aug. 16, 1921    4 Sheets-Sheet 4

Inventor.
Georges H. E. de Ram
by Chas. J. Hill
Atty

Patented June 5, 1923.

1,457,884

UNITED STATES PATENT OFFICE.

GEORGES HENRI ERNEST DE RAM, OF PARIS, FRANCE.

SUSPENSION OF AUTOMOBILES AND OTHER VEHICLES.

Application filed August 16, 1921. Serial No. 492,755.

(GRANTED UNDER THE PROVISIONS OF THE ACT OF MARCH 3, 1921, 41 STAT. L., 1313.)

*To all whom it may concern:*

Be it known that I, GEORGES HENRI ERNEST DE RAM, citizen of the French Republic, residing at Paris, Department of the Seine, in France, and having P. O. address 118 Boulevard Exelmans, in the said city, have invented certain new and useful Improvements in or Relating to the Suspension of Automobiles and Other Vehicles (for which I have obtained patents in France, Nos. 520,556, 525,468, and addition 24,239, filed July 13, 1920, October 1, 1920, and November 8, 1920, respectively, and in Great Britain, No. 181,728, filed July 12, 1921; and I have filed applications in France, Germany, Belgium, and Italy, dated April 4, 1921, April 26, 1921, July 8, 1921, and July 11, 1921, respectively); and I do hereby declare the following to be a full, clear, and exact description of the invention, such as will enable others skilled in the art to which it appertains to make and use the same.

The present invention has for its object improvements in the suspensions of automobiles and other vehicles.

In the arrangements ordinarily employed, the springs act directly on the axles and also ensure the connection between the latter and the chassis.

According to the present invention, the axle is connected to the chassis by arms, levers or springs, pivoted in such a manner that by preventing all lateral movement of the axle relatively to the chassis, the axis is able to follow freely all the irregularities of the road. The suspension springs act as a point determined by these arms, levers or springs, and this point is so chosen that a considerable movement of the axle produces only a small bending of the springs and ensures also a very smooth suspension.

In the accompanying drawings:

Figures 1 to 3 show diagrammatically the improvements applied to different arrangements of suspension springs.

Figures 4 to 8 represent arrangements for connecting the axle to the chassis.

Figures 9 to 16 show several applications of the invention.

Figure 6:
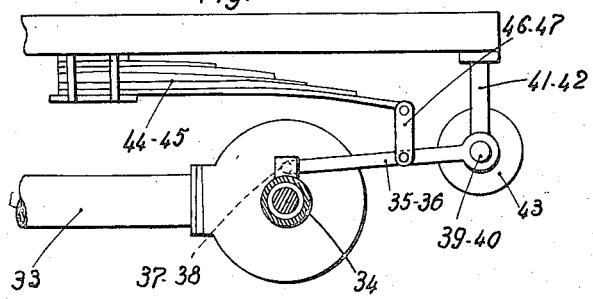

In the arrangement shown in Figure 1, the spring 1 is pivoted to the chassis 2 at 3 and is connected thereto by shackles 4, its front end being pivoted at 8 to an arm or lever 5 which is itself pivoted to the chassis 2 at 6 and fixed to the axle 7.

Figure 2 shows the arrangement applied in the case of quarter elliptic springs, in which the spring 1 is fixed rigidly under the chassis 2 and its front end is connected at 10 to the lever 6 fixed to the axle 7 and adapted to oscillate at 6 on the front end of the chassis.

In Figure 3 quarter elliptic springs are employed. The spring 15 is pivoted at 16 to the chassis 2 and its end is fixed to the axle 7, the spring 15 being connected by shackles 17 to a half spring 18 fixed rigidly to the chassis 19.

In the arrangements shown, the springs fixed to the axle are subjected to a slight torsional movement when one of the sides thereof is lifted by the passage of a wheel over an obstacle.

In the arrangements shown in Figures 1 to 2, the axle being connected to the chassis by arms or levers, it has been necessary to provide systems of pivoting which are shown in Figures 4 to 8.

In Figure 4, the axle is shown at 23 with its two wheels 24—25; this axle corresponds to the axle 7 of Figure 1. On the left hand side of the axle 23 is a comparatively long rigid arm 26 and on the right hand side is the comparatively short rigid arm or yoke 27. To the yoke 27 is pivoted one end of the lever 28, the other end of which is connected to an end of the cross bar 29. The other end of the cross bar is connected to the yoke 31 pivoted to the outer end of the arm 26. The bearings 30 of the cross bar 29 are adapted to form connections with the ends of the chassis side bars, as of the bar 2 with the connection at 6, as shown in Figure 1. Also the arms 26—31 and 27—28 are adapted to provide connections, as at c—d, for the springs interposed between the chassis and the wheeled axle; such a connection is shown at 8, between the spring 1 and the member 5, Figure 1. The wheeled axle 23, the extension members 26—31 and 27—28, together with the cross bar 29, constitute a quadrilateral formation that is diagonally divided along the line a—b of Figure 4, with the two members mutually articulated coincidentally with said line.

The connection so formed provides a couple between the wheeled axle and the chassis that permits considerable vertical play of one wheel in passing over an obstruction that is not imparted to the other wheel.

When the wheels move in the same direction and by an equal amount the whole of the connection will oscillate about the axis *e—f* passing through the centre of the shaft 29. If the wheel 24 moves alone, the axle 23 will oscillate about the axis *a—b*, the whole connection formed by the lever 28, the shaft 29 and the yoke 31 scarcely participating in the movement according to the position which has been given to the axis *a—b* relatively to the axle 23. If on the contrary the wheel 25 rises or falls, the arrangement of the lever 28 on the shaft 29 and of the yoke 31 will follow the movement, the wheel 24 remaining practically stationary.

The springs act on the arm 26 and the lever 28 at *c—d*, and as these points are chosen so as to give the desired degree of flexibility to the suspension, they must be also placed in such a way with respect to the axes *a—b* and *e—f* that the action of the springs may be the same at both ends of the axle.

The arrangement of the arm 26 and of the lever 28 prevents all lateral movement of the axle.

Figure 5 shows a construction similar to that shown in Figure 4 but the shaft 29 and the pivot 31 have been replaced by a ball or universal joint 32.

The arrangements shown in Figures 1 to 5 apply to front springs but may also be applied to rear springs.

Under these conditions the arm 26, rigidly connected to the axle 23, resists the couple produced by the rise of the wheel and in order to avoid all action of this couple on the shaft 29, the pivot 31 will have to be placed at the intersection of the lines *a—b* and *e—f*. The thrust will be transmitted by the arm 26 the lever 28 and the bearings 30.

Figure 7:
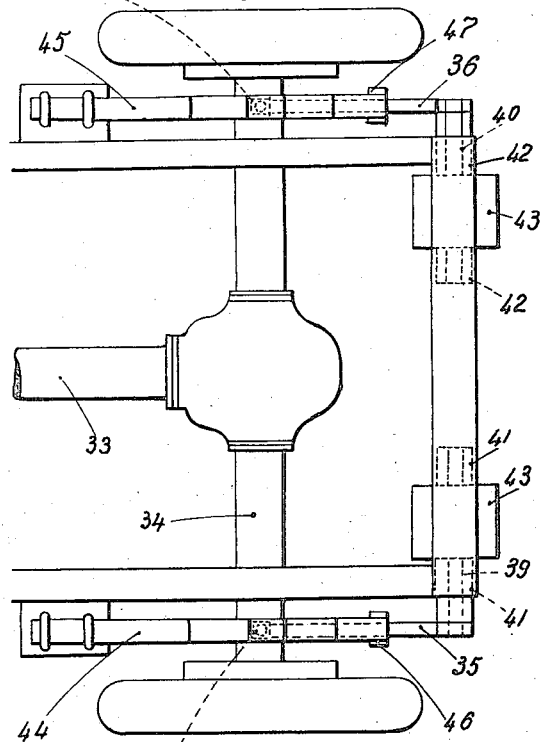
Figure 8:
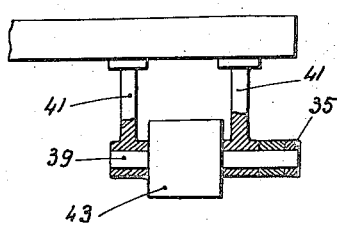

Figures 6, 7 and 8 apply to an arrangement for a rear axle where the resistance to the couple produced by the rise of the wheel is assured by a device which is independent of the suspension, in the example shown, the tube 33 surrounding the gear shaft connecting the gear box to the rear bridge or axle 34. The axle 34 is connected to the chassis by the levers 35 and 36 shown at the rear of the axle, but which might be placed in front of the said axle, and which transmit the power of the necessary thrust for the propulsion of the vehicle. The levers 35, 36 are pivoted to the axle 34 by ball or universal joints 37—38 one of which, 37 for example, will be mounted without any play, while the other 38, will have to permit a slight amount of play laterally, so as to avoid any abnormal force when the axle assumes an oblique position. The levers 35, 36 are connected to the chassis by shafts 39, 40 mounted in the bearing 41, 42 rigidly attached to the chassis and between which are mounted dash pots 43 which may be either of the friction or liquid type of the usual kind.

The lever 35, the joint 37 of which is pivoted without any play to the axle 34, will therefore prevent any lateral movement of the axle relatively to the chassis and for this purpose the shaft 39 of the lever 35 is guided in the bearings 41 which are a suitable distance apart and between which is interposed a dash-pot 43.

The springs 44, 45 are connected to the levers 35, 36 by shackles 46—47.

In the example shown in Figures 6 and 7, quarter elliptic springs are shown, but it must be quite understood that any suitable spring may be used.

It will be well to note that the arrangement described in connection with the rear axle is capable of being modified. For example, the pivoted arrangement shown in Figures 8 to 10 may be adopted, the gear casing being made to turn around on an oscillating bar, or if it is not desired to give to the bar the form necessary to turn around the casing it may be made in two pieces and each inner end of the two bars would then be mounted on a pivot on each side of the gear casing.

We are going to shown now how 1st the quadrilateral system described above can be applied to a rear axle of the type called "with oscillating bridge and central tube of transmission" and 2nd how it is possible to make use of a pneumatic corrector of resilience when a suspension with spiral springs is associated with a quadrilateral mounting.

Figures 9 to 14 apply to the above arrangements.

Figures 15 and 16 show examples of brakes, one of them being hydraulic and the other a friction one, both of them being designed to be applied to suspension devices.

For the sake of clearness, on the Figures 9 and 10, the quadrilateral mounting is shewn as being fixed to the back of the chassis and behind the axle.

The mounting comprises two quadrilateral members, the main one being shewn in *a, b, c,* and *d,* it can swing on the diagonal *b, d* as axis, and a secondary quadrilateral member *c, d, e* and *f* which can swing on the first along *c, d,* and on itself, along the diagonal *d—f*.

The main quadrilateral member comprises the shaft 50 and two connecting rods 51 and 52, the fourth side is imaginary being the axis of rotation *c—d*.

The secondary quadrilateral member comprises two connecting links 53 and 54 and two axis of rotation *c—d* and *e—f*. In the example given, the axis *e—f* coincide with the axis of the axle, but it is not necessary.

The shaft 50 is carried by the back supports for springs in 55 and 56. The connecting rods 51 and 52 connect the shaft 50 to the axle through the double links 53 and 54. The connecting rod 51 is rigidly fixed to the shaft 50. The connecting rod 52 is pivoted on said shaft according to the diagonal *b d* of the quadrilateral member, the center of the pivot being the intersection of the axis *a—b*, *d—b* and *c—b*

The connecting rod 51 is connected to the links 53 by a ball joint 57, the center of which is the intersection of the diagonals *b—d* and *d—f* and of the axis *c—d*. The links 53 are rotatably mounted on the rear axle.

The connecting rod 52 is connected to the links 54 by an ordinary axis 58, in the direction of the axis *c—d*. The links 54 are rotatably mounted on the rear axle with a ball joint the axis of which is the intersection of the axis *e—f* and *d—f*.

The connecting rods 51 and 52 are connected by a bracing comprising the arms 59 and 60 which can pivot in 61 according to the diagonal *b—d*; this bracing gives rigidity to the whole. The arms 59 and 60 are integral with the connecting rods 51 and 52 respectively. They are placed at the back of the casing of the differential.

For the application of a pneumatic corrector of resilience of a known type in the case of a suspension comprising spiral spring, reference is made to the Figures from 11 to 14.

To the chassis, Figures 11 and 13, two cylinders 62 and 63 are fixed, each of them comprising a piston and one, or more, spiral spring. These springs transmit their pressure to a connecting rod 64 and to a lever 65 rigidly keyed on a shaft 66 for cylinder 63 and 67 for cylinder 62.

On the shaft 66 is keyed the rod 68 which at its other end can pivot in 70 on the axle 69.

The shaft 67 is connected to the rod 72 through a ball joint 71, said rod at its other end being rigidly connected in 73 to axle 69.

The quadrilateral member is here made up of the axis of rotation A B comprising the shafts 66 and 67, the two rods 72 and 68 and the axle 69. It can swing on the diagonal C—D, the center of the joint 71 being at the intersection of the axis A—B and C—D. The pivot in 70 is directed according to the diagonal C—D.

Figure 18:
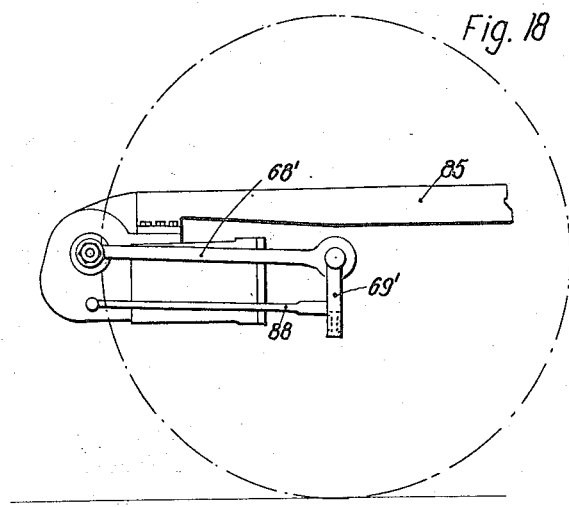
Figures 17, 18 and 19 show a modification of the arrangement of the device shown in Figure 11.
Figure 17:
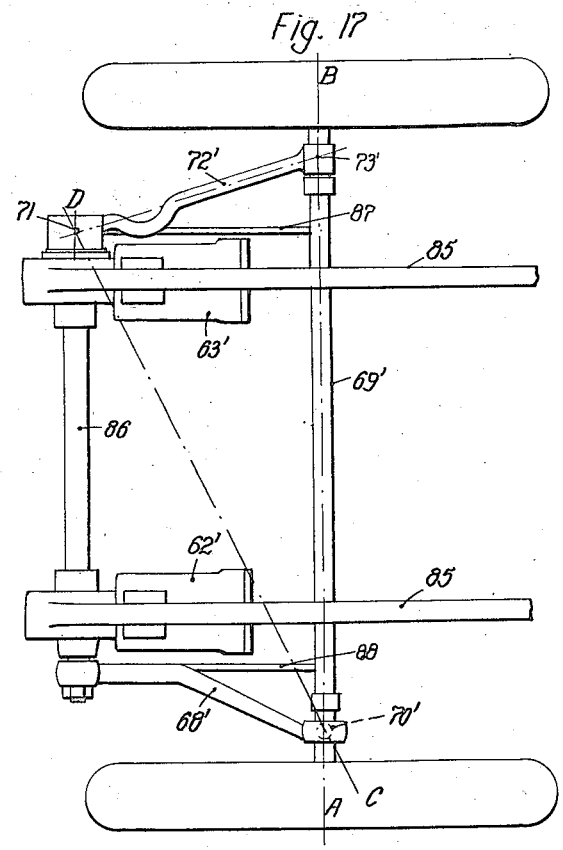
Figure 19:
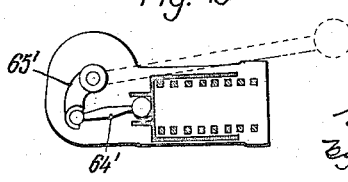

Figures 17, 18 and 19 refer to a modification in the mounting of the device just described; for the same members the same numerals have been kept but indexed with a prime. It may be noted that cylinders 62' and 63' are fixed to the side-bars 85—85. The connecting rods 68' and 72' are connected to the cylinders in the same way as described in relation to Figure 11. The connections with the axle, however, are not the same, the fork 70, Figure 11, is changed into a ball or universal joint 70', and instead of the rigid fixing 73, the rod 72' is rotatably connected to the axle 69 in 73'. Small connecting links 87 and 88 with ball or universal joints on the cylinders and axle constitute, with the rods 68' and 72', parallelograms which oblige the axle to remain parallel to itself while it is displaced.

A good suspension, as it is known, must be ruled by the two following conditions:

(1st) The resilience must vary inversely to the load.

(2nd) The resilience must vary inversely to the square of the speed.

The first condition can be satisfied by a judicious fixing of the levers 65, Figure 14, relatively to the rods 72 and 68. For the second one it can be satisfied in making use of a pneumatic corrector of resilience.

Any displacement of the axle, above its position of equilibrium, produces a displacement of the piston towards the bottom of the cylinder and consequently an increase of pressure in said cylinder.

When the running is moderate, the pressure is weak on account of leakages which cannot be prevented, or are called forth, and because the compression is isothermic.

For great speeds, leakages will not have time to produce any effect and besides compression will be adiabatic, pressure consequently must be high. The pneumatic action will be added to that of the spring and the resilience of the whole must consequently be decreased.

In Figure 12 is shown an arrangement in which the universal joint 71 is replaced by a ball joint. The shaft 67 carries a bent lever which abuts on the connecting rod 72 and acts on it according to the pressure of the spring.

Figure 14 shows a simpler cylinder, the spring is directly placed in the body of the piston; the neutral space in the cylinder can be reduced at will by the introduction in it of a given quantity of oil.

The devices described satisfy to the following conditions:

(1st) The connection of the axle with the chassis is such that the axle is absolutely free to follow all the up and down of the road but without being allowed to displace itself laterally relatively to the chassis.

(2nd) The device besides is completely inclosed, springs and all connecting pieces being protected against dust, mud, etc., and being easily lubricated.

(3rd) The application of the laws enunciated above.

For light vehicles, where the ratio of the non suspended load and the suspended load, is not great, the apparatus can be provided with a brake acting only when the axle is raising, and the action of which is to damp the momentum of the axle in order to prevent said axle to leave the ground.

As an example of what can be done a description of two brakes is given below, one being hydraulic and the other a friction one, which could be applied to the device.

The bottom of the cylinder, in the hydraulic brake Figure 15, communicates with a reservoir 77 through two valves 75 and 76 which opens in opposite direction. The cylinder, as well as the reservoir 77, are filled with oil up to the level N—N.

When the piston 78 moves in the direction of the arrow it displaces the oil in the reservoir and compresses the air in the top of it; at the same time the valve will be lifted against the pressure of its spring. It follows that a counterpressure, the value of which is a function of the tension of the spring, will exist on top of piston. This pressure will produce the effect of a brake preventing the vertical displacements of the axle.

The piston will come back freely, the oil passing easily into the cylinder through the valve 75 the spring of which is weak.

The reservoir 77 communicates with the cylinder through a channel 79. The displacements of the piston are free consequently till the opening of said channel is closed by the said piston; from that time the oil will be pushed back through the valve 76.

The friction brake, Figure 16, comprises a drum 80 integral with the shafts 66 or 67, around which is placed a friction band 81 fixed at one end to a point 82; the other end of said band 81 having the shape of a rod, said rod passing through a support 83, on said rod externally to the support 83 is placed a spring 84, in such a manner that its tension tends to maintain the band in contact with the drum.

According to the well known theory of such class of brakes, the drum 80 must be checked when it moves in the direction of the arrow, that is, when the axle is lifted up; displacements in the opposite direction are practically free.

It must be understood that the drum 80 could be made hollow and the band brake 81 placed inside it, or the band brake could be replaced by shoes.

In the examples given, the quadrilateral member is rectangular, but it is clear that this is not absolutely necessary, it could be made trapezoidal or of any irregular form.

Claims:

1. In a vehicle suspension, the combination with a chassis and a wheeled axle, of a couple connecting the two comprising said axle and connected extension members in quadrilateral formation diagonally divided and with the two parts mutually articulated coincidentally with the diagonal division therebetween, and means for connecting the chassis to the couple on opposite sides of the diagonal division thereof.

2. In a vehicle suspension, the combination with a chassis and a wheeled axle, of a couple connecting the two comprising said axle and connected extension members in quadrilateral formation diagonally divided and with the two parts mutually articulated coincidentally with the diagonal division therebetween, and springs interposed between the chassis and the couple on opposite sides of the diagonal division thereof.

3. In a vehicle suspension, the combination with the chassis and axle, a long and short, substantially horizontal, extension carried by said axle, short and long lever members pivoted to said long and short extensions respectively, a shaft connecting the free end of said members for attaching the chassis thereto, the whole forming a quadrilateral member, the pivots of said extensions and members being diagonally arranged, and springs interposed between the intermediate portions of said quadrilateral member and the chassis.

4. In a vehicle suspension, the combination with the chassis and axle, of a quadrilateral member comprising two hinged sections, the pivots of said sections being diagonally arranged, whereby said members can swing along a diagonal, one end of said quadrilateral member being connected to the axle and the other to the chassis, dashpots for said latter connections, and a spring interposed between the intermediate portions of said quadrilateral member and chassis.

5. In a vehicle suspension, the combination with a chassis and a wheeled axle, of a couple connecting the two comprising the axle, two longitudinal members extending from the axle and a cross member at the ends of the longitudinal members parallel to the axle, said axle and connected members constituting a rectangular formation, which is diagonally divided and the two parts mutually articulated coincidentally with the diagonal division therebetween, and means for connecting the chassis to the longitudinal members of the couple on opposite sides of the diagonal division of said couple.

6. In a vehicle suspension, the combination with a chassis and a wheeled axle, of a couple connecting the two comprising the axle, two longitudinal members extending from the axle and a cross member at the ends of the longitudinal members parallel to the axle, said axle and connected members constituting a rectangular formation, which is diagonally divided and the two parts mutually articulated coincidentally with the diagonal division therebetween, and springs connecting the chassis with the longitudinal members of the couple on opposite sides of the diagonal division of said couple.

7. In a vehicle suspension, the combination with a chassis and a wheeled axle, of a couple connecting the two comprising the axle, two longitudinal members extending from the axle and a cross member at the ends of the longitudinal members parallel to the axle, said axle and connected members constituting a rectangular formation, which is diagonally divided and the two parts mutually articulated coincidentally with the diagonal division therebetween, said chassis being attached to said cross member of the couple, and springs interposed between the chassis and the longitudinal members of the couple on opposite sides of the diagonal division of said couple.

In testimony whereof I affix my signature.

GEORGES HENRI ERNEST de RAM.